May 2, 1950     A. T. GREGORY     2,505,857

TRANSMISSION FOR DUAL ENGINE DRIVES

Filed July 13, 1946     3 Sheets-Sheet 2

INVENTOR:
ALFRED T. GREGORY
BY
Campbell, Bumbaugh & Lee
ATTORNEYS

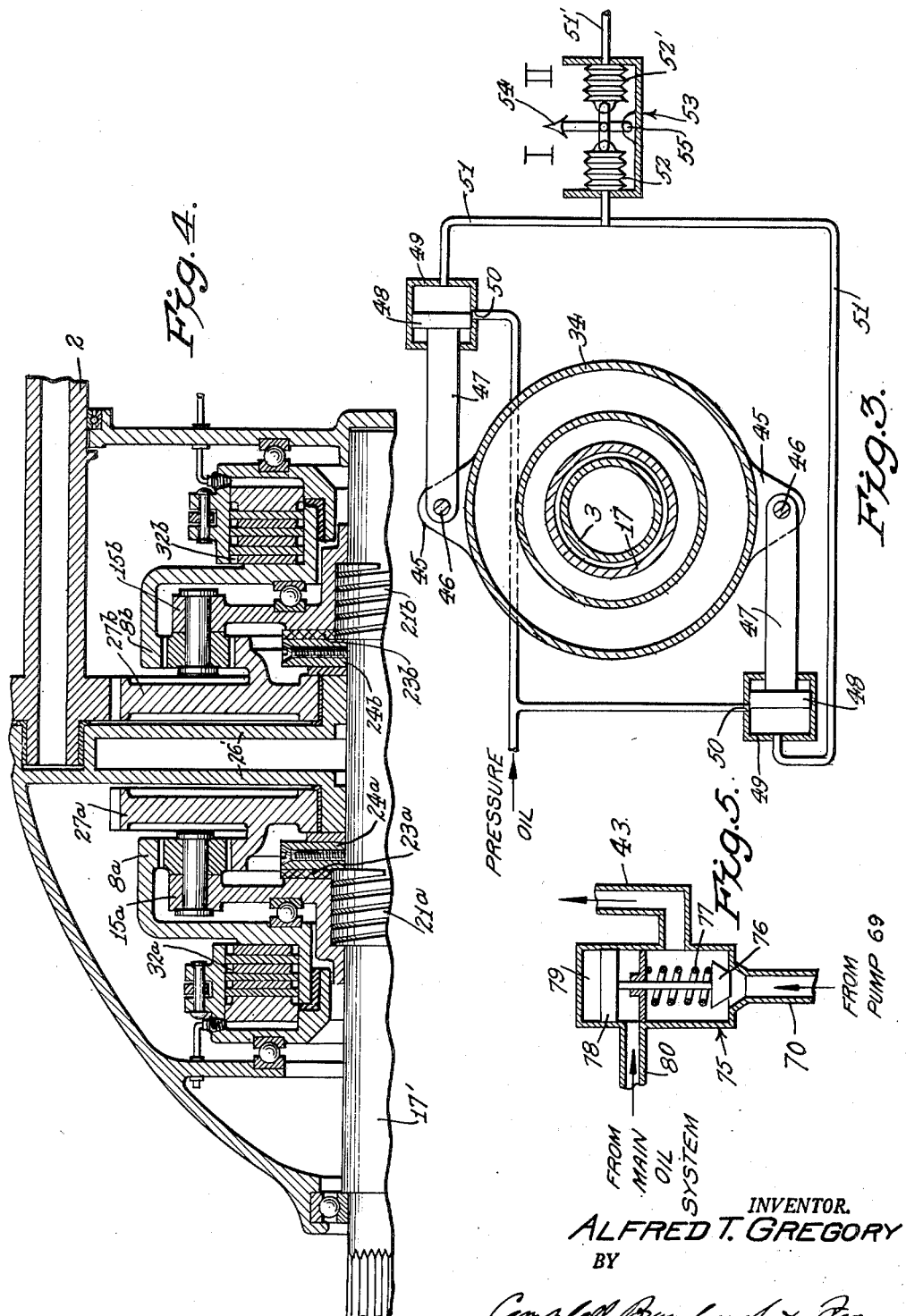

Patented May 2, 1950

2,505,857

UNITED STATES PATENT OFFICE 2,505,857

TRANSMISSION FOR DUAL ENGINE DRIVES

Alfred T. Gregory, Manhasset, N. Y., assignor to Fairchild Engine and Airplane Corporation, Farmingdale, N. Y., a corporation of Maryland Application July 13, 1946, Serial No. 683,486

11 Claims. (Cl. 74—675)

1

This invention relates to dual engines, and has particular reference to a power plant comprising two separate power input shafts which may be connected jointly or severally at will to a common power output shaft for driving one or more members such as aircraft propellers, although the invention is not limited to aircraft use.

It is often desired to improve the reliability of airplanes by installing two or more engines in a single plane. Then, in case of an engine failure, the airplane can maintain flight on the remaining engine or engines. This safety requirement is essential, especially for airline aircraft, in order to obtain reliability and to meet safety regulations. The take-off condition in single engine aircraft is particularly hazardous, as the failure of an engine can cause the airplane to crash. Other conditions of flight may also be encountered during which the failure of the engine in a single engine airplane would result in loss of the airplane with all aboard. The requirement for multi-engined airplanes, therefore, has been well established.

In the conventional twin engine airplane, the engines are located on either side of the fuselage. The distance out along the wing is kept as small as possible to keep the thrust line as close to the center of the airplane as possible. At the same time, the propeller diameter is limited by the distance from the fuselage out to the engine and it is necessary therefore to keep the distance as near to the required propeller radius as possible. Thus, the actual location is a compromise governed by the desired propeller diameter and the thrust center line location.

In case of an engine failure with the conventional arrangement, the good engine continues to develop forward thrust, whereas immediately following engine failure and before there is time to feather the propeller from the failed engine, that propeller windmills and produces a high negative thrust. Because of their disposition along the wing, the failure of one engine thus produces a high yawing moment on the airplane which is difficult to control and may become a serious hazard. In any event, the necessary controlling method adds drag to the airplane and, consequently, further impairs performance.

The location of an engine nacelle on the wing is a further disadvantage from an aerodynamic standpoint in that it disturbs the air flow, particularly over the top surface of the wing. A considerable improvement in the efficiency of the wing would be gained by mounting the two engines in the fuselage and coupling them together, either to a single large diameter propeller with attendant advantages, or to two coaxial propellers. The wing could, therefore, be made smaller, thus reducing airplane drag. In addition to reducing wing drag, the nacelle drag is eliminated. The coupling of two engines together within the fuselage, as proposed in this invention, prevents an engine failure from causing a high yawing moment to be applied to the airplane. In the event of a failure of either engine, the other engine can be made to drive the propeller when a single propeller is used, or if two propellers are driven jointly by the two engines, the good engine can be made to drive both propellers, so that the thrust is at all times located on the center line of the airplane. This results in a considerable improvement in the reliability of the airplane for certain operating conditions over the arrangement in which the two engines are mounted in nacelles on the wings, as in conventional twin-engined airplanes.

When two engines are coupled together to a common propeller or propellers, it is desirable to so arrange them that, in case of failure of one of the engines, this engine would automatically be disconnected from the propeller shaft. It may be desirable, however, to provide a manual override to disconnect either engine at will. In many cases, a minor failure may occur and it may become extremely important for the pilot to shut off the failed engine to avoid serious damage to the engine or the airplane, or both. Probably most cases of serious engine failure could be avoided by shutting off the engine while the failure was in its early stages. Accordingly, the present invention continuously indicates the relative condition of each engine and enables the pilot to disengage and re-engage an engine at will.

In accordance with the present invention, therefore, a dual engine is provided, including two sources of power, such as internal combustion engines or two separate sets or banks of cylinders, each operating a separate crankshaft, these shafts being connected through gearing to each other and to a common power output shaft, with alternative means for automatically or manually connecting or disconnecting either or both power input shafts to or from the power output shaft. Preferably, mechanism is also provided to indicate either the relative or the absolute torque of each power input shaft for the purposes of determining total horsepower when both input shafts are coupled to the output shaft for driving the same or of determining relative power input from each engine or, more particularly, of determining any drop in power input from either engine which might indicate malfunctioning of that engine.

In a preferred embodiment of the invention, the two power plants or the two banks or sets of engine cylinders are arranged in parallel relation with their respective crankshafts coupled to corresponding planetary gearing encircling a common power output shaft and connectible thereto at will through an overrunning clutch by a hydraulically operated brake, each hydraulically operated brake being separately operable so that each power input shaft may be coupled to the power output shaft quickly, positively, and at will.

The overrunning clutch is interposed between the planetary gearing and the power output shaft and disconnects the two when the latter overdrives the former, as in case of failure of the corresponding engine, so that the remaining operating engine is not required to drive the malfunctioning engine. A third clutch interposed between the planetary gearing and the power output shaft and operable at will with the hydraulically operated brake, serves to connect the rotating power output shaft whether driven by an operating engine or the windmilling propeller during a glide, to an inactive engine so as to prevent over-revolution of the propeller. This clutch may also be used to start one engine from the other.

Preferably, means having a predetermined resistance is interposed between a stationary member and the relatively fixed element of each hydraulically operated brake and connected to a corresponding dial calibrated in torque units, both dials being positioned side-by-side or in juxtaposition in the operator's view so as to indicate the degree of uniformity of torque input as between the two power input shafts. A single dial may be used in which the pointer position at the center would indicate equal torques in both engines. A swing of the pointer to either side would then indicate malfunctioning of one engine or of the other, as in the case of a faulty spark plug, for instance, and enable the operator to disconnect the malfunctioning engine by disengaging the hydraulically operated brake. So long as either engine produces a driving torque to the power output shaft all three clutches will remain in engagement, unless additional declutching means were provided which is so controlled as to be responsive to a sudden drop in power of either engine, or to loss of engine oil pressure or other indication of engine malfunctioning, to thereby cause a disengagement of the hydraulically operated brake and disconnection of the corresponding engine, with simultaneous throttle closure thereof.

The whole mechanism, exclusive of the torque meter dials, is preferably housed in a stationary casing extending between the two engines and containing the two complete sets of planetary reduction gearing and clutches in two separate chambers, whereby the two sets of planetary gearing are completely separated so that, in the event that one set becomes damaged, the other set will not be affected, and wherein damage from one reduction gear unit will not affect the other, so that the power output shaft or shafts receive power independently, although simultaneously, from both power plants when simultaneously coupled thereto.

For a more complete understanding of the invention, reference may be had to the accompanying drawings, in which:

Fig. 3 is a partially schematic transverse section through Fig. 1 as seen along the line 3—3 thereof, and illustrates mechanism for indicating torque output of each of the power sources;

Fig. 4 is a section similar to that of Fig. 1, but showing a single power output shaft driven by either or both power input shafts; and, Fig. 5 illustrates a pressure relief valve for coordinate control of the brakes and clutches by main oil system and planetary unit pump oil pressure.

Figure 1:
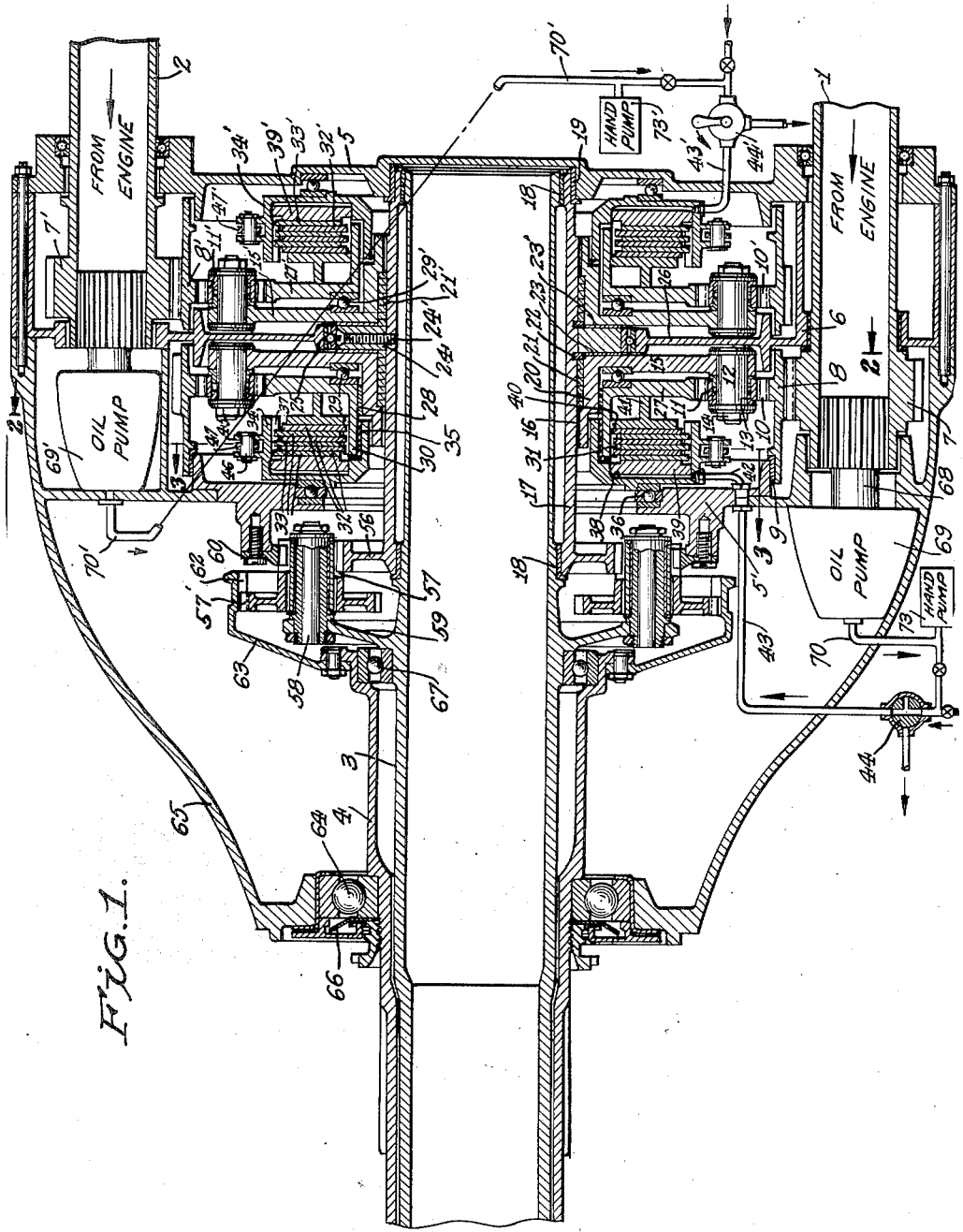
Figure 1 is an axial section through the driving mechanism of this invention for severally coupling two power input shafts to two power output shafts at will, as seen along the line 1—1 of Fig. 2.

Referring particularly to Fig. 1, numeral 1 designates a power input shaft connected to any source of power, such as an internal combustion engine, not shown, of which shaft 1 may be one end of its crankshaft, whereas numeral 2 designates the end of the other power input shaft such as the crankshaft of a second internal combustion engine or the second shaft of a twin crankshaft engine, for example. Numerals 3 and 4 designate co-axial power output shafts where two power output shafts are required, but if only one is required, both power input shafts 1 and 2 may be connected thereto, as shown in Fig. 4, to be described. Inasmuch as the connection between each power input shaft 1 and 2 and the power output shafts 3 and 4 is the same, a description of the connection pertaining to one of the shafts will suffice.

Figure 2:
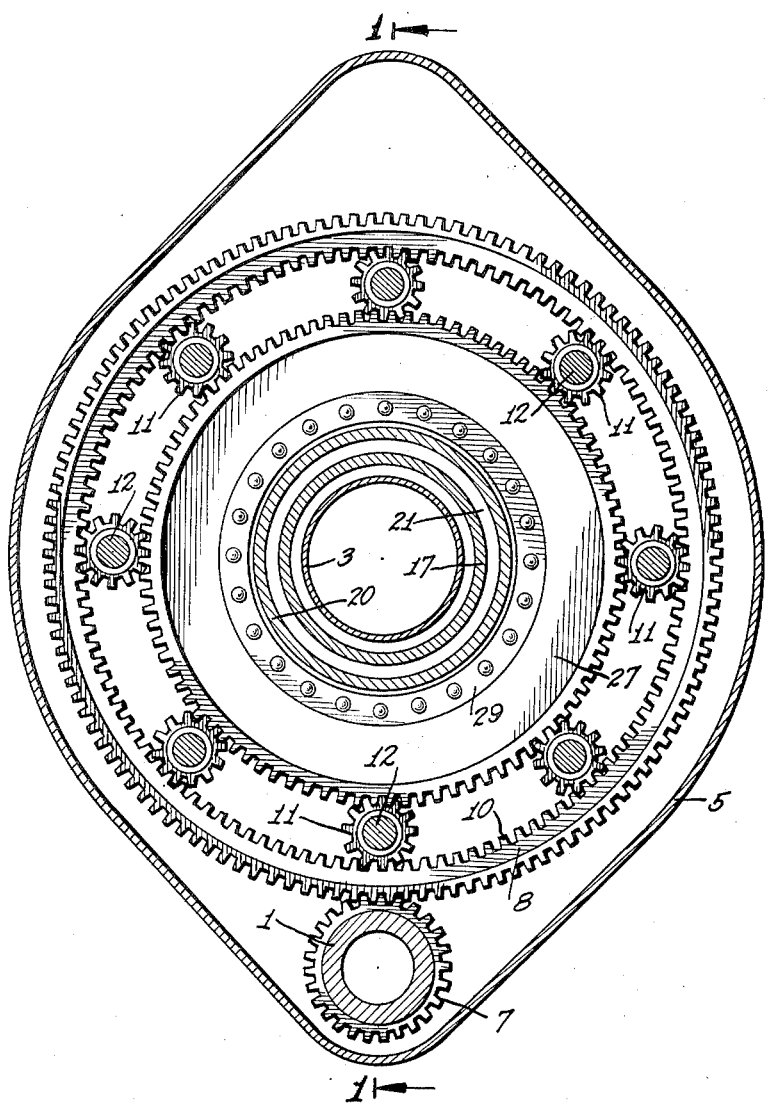
Fig. 2 is a transverse section through the mechanism of Fig. 1, as seen along the line 2—2 thereof.

Power input shaft 1 is journalled for rotation within housing 5 on bearing 6 and has an integral external spur gear 7 which meshes with an external ring gear 8 journalled on bearing 9 in the housing 5. Formed integrally with external ring gear 8 is an internal ring gear 10 which meshes with planet pinions 11 each journalled on a stub shaft 12 over bearing 13. Each stub shaft is carried by a spider 15, being held in place by a nut 14 threaded on the free end, which also secures the corresponding pinion thereon. Spider 15 carries a circular series of such planetary pinions 11, such as eight, more or less, as shown in Fig. 2.

The spider 15 is journalled at 16 on a tubular shaft 17 telescoped over inner power output shaft 3 over bearings 18 and journalled in housing 5 at bearing 19. The inner surface of the hub 20 of spider 15 is provided with an annular cavity containing a spirally-wound spring or snubber type of overrunning friction clutch 21 keyed at one end 22 to the tubular driven shaft 17 and so wound and arranged that the normal torque through spider 15 causes snubber clutch 21 to expand and frictionally couple tubular shaft 17 to spider 15. Conversely, when tubular shaft 17 overdrives spider 15, as in case of failure of the engine connected to the power input shaft 1, snubber clutch 21 will be contracted to disengage spider 15 from tubular shaft 17, as will be described in greater detail.

Spider 15 is slightly axially slidable along tubular shaft 17 on bearing 16 so as to engage friction brake plate 23 interposed between it and radial flange 24 secured to tubular shaft 17 by screw 24'. It will be observed that when spider 15 is normally coupled to tubular shaft 17 by snubber clutch 21, there is no relative rotative movement between spider 15 and flange 24 since the latter is also connected to tubular shaft 17, so that in normal operating conditions, friction plate 23 is inactive. Under other conditions, friction plate 23 is active, as will be explained. Flange 24 rotates in a bearing 25 on a partition 26 dividing housing 5 into two separate chambers, thereby sealing the coupling mechanism of power input shaft 1 from that of power input shaft 2.

Meshing with the circular series of planet pinions 11 is a sun gear 27, which is journalled on bearing 28 on the hub 20 of spider 15 and which is spaced from the latter by a ball thrust bearing 29. The exterior surface of hub 30 of sun gear 27 is provided with axial splines 31 engaging spaced brake plates 32 so that the latter rotate with sun gear 27 and are axially slidable relatively thereto. Interleaved brake plates 33 are similarly axially splined at 37 on a ring 34 encircling the hub 30 of sun gear 27 which rotates thereon on bearing 35. Ring 34 is held against axial movement to the left by thrust bearing 36 interposed between it and an extension 5' on housing 5.

The right-hand side of ring 34 is provided with an annular recess 38, which serves as a cylinder in which an annular piston 39 is axially slidable and abuts the left-hand brake plate 33, as seen in Fig. 1. The right-hand brake plate 32 engages an annular backing plate 40 held against rotation relatively to sun gear 27 by spline 31 and having an axial flange 41 abutting sun gear 27. Piston 39 is actuated by fluid pressure within cylinder 38 supplied thereto by a flexible tube 42 connected to a pipe 43 leading to a source of fluid pressure such as an oil pump, not shown, but controlled by two-way hand valve 44 in pipe 43.

Ring 34 may be rigidly secured to the housing 5 against rotation, but is preferably allowed a slight relative rotative movement so as to serve as a source of torque measurement. As shown in Figs. 1 and 3, ring 34 is provided with split lugs 45 at diametrically opposite points which are connected by pins 46 and links 47 to pistons 48 in stationary cylinders 49 supplied with fluid such as oil at high pressure through orifices 50 normally closed by the respective pistons 48. Cylinders 49 are connected by pipes 51 to one bellows 52 of a differential pressure gauge 53 whose opposite bellows 52' is connected to pressure pipe 51' from the corresponding torque mechanism for the other half of the power plant. Pointer 54, pivoted at 55, is connected to both bellows for a purpose to be explained.

The other half of the mechanism to the right of partition 26 in Fig. 1 is constructed in the same way, the crankshaft or other power input shaft 2 being provided with a spur pinion 7' corresponding to pinion 7 and meshing with external ring gear 8' having an internal ring gear 10' meshing with planet pinions 11' carried by spider 15' and in turn meshing with sun gear 27' journalled thereon and spaced axially therefrom by thrust bearing 29'. Spider 15' is normally coupled to tubular shaft 17 by snubber type overrunning clutch 21', and, like clutch 21, is adapted to uncouple the right-hand unit when shaft 17 overruns shaft 2.

Both spider 15' and sun gear 27' are slightly movable axially to the left against friction disc 23' by piston 39' in annular cylinder 34' to which pressure oil is supplied by hand valve 44'. Piston 39' also engages brake 32', 33' to hold sun gear 27' stationary subject to the play afforded by the torque meter mechanism connected to annular cylinder 34' by link 47'. The torque indicating mechanism for input shaft 2 is identical to that shown in Fig. 3, and cooperates therewith to actuate pointer 54, as described.

Each planetary gear train, i. e., that from shaft 1 and that from shaft 2, is preferably separately lubricated, and the lubricant for each is substantially confined thereto by the transverse partition 26, which also precludes injury to one side by broken parts being thrown from the other side in case of breakage. The transverse partition 26 can constitute two walls separated by some distance or space from each other, as shown in Fig. 4, in order to further insure that broken parts from one gearing chamber will not affect the other.

Where coaxial and oppositely rotating power output shafts are required, reversing gearing, preferably with speed reduction, is interposed between tubular driven shaft 17 and the power output shafts 3 and 4, as shown in Fig. 1. Such connecting gearing may include a sun gear 56 formed on the outer end of tubular driven shaft 17 for driving planet pinions 57 journalled on stub shafts 58 carried by a spider 59 on inner power output shaft 3. Planet pinions 57 also mesh with stationary ring gear 60, secured to extension 5' of housing 5. Large planet gears 57', secured to small planet pinions 57 so as to rotate therewith on stub shafts 58, mesh with internal ring gear 62 formed on a bell 63 secured to outer power output shaft 4.

Outer power output shaft 4 is journalled on a ball bearing 64 carried by the frame 65 on which the housing 5 is secured. An oil slinger ring 66 rotating with outer power output shaft 4 prevents lubricant from bleeding outwardly along shaft 4. Inner power output shaft 3 is spaced from and journalled in shaft 4 by bearing 67 and another bearing at the outer end, not shown, but which latter may be in the propeller itself. Both power output shafts may be provided with splines or other coupling means for connecting thereto driven members, such as an aeronautical or marine propeller, and the like.

In operation, and considering the planetary gearing driven by power input shaft 1 and shown at the left of partition 26 in Fig. 1, movement of valve 44 to the open position shown, connects pressure fluid, such as oil, to pipe 43 and cylinder 38 to thereby engage brake 32, 33, thus holding sun gear 27 stationary. Rotation of power input shaft 1 causes its pinion 7 to rotate external ring gear 8 and integral ring gear 10, so that planet pinions 11 are driven by the latter and roll around stationary sun gear 27, to thereby rotate spider 15. As the spider 15 begins to overrun tubular shaft 17, the frictional drag on snubber clutch 21 causes it to expand and frictionally engage spider 15 so that the latter is coupled to tubular power output shaft 17.

It will be observed that the use of a wrapping spring or snubber type overrunning clutch 21 in combination with an hydraulically-operated plate type brake 30—34 avoids the possibility of the shock load from the snubber clutch 21 from causing damage or overloading of the mechanism, since the plate type brake will slip sufficiently to absorb the shock.

Tubular driven shaft 17 is accordingly connected to power output shafts 3 and 4 in the manner described through the reducing and reversing gear train 56, 57, 60, 61 and 62, so that power output shafts 3 and 4 are driven in opposite directions and at reduced speed compared to power input shaft 1, the speed reduction ratio being determined by the pitch diameters of the aforementioned gears in the train.

In addition to engaging brake 32, 33 in the manner described, actuation of valve 44 to the open position shown also tends to cause relative axial movement between back plate 40 and ring 34. However, inasmuch as ring 34 is prevented from moving to the left by engagement with housing extension 37 through thrust bearing 36, piston 39 moves brake discs 32, 33, back plate 40, sun gear 27, thrust bearing 29 and spider 15 slightly to the right. This movement causes the right-hand surface of spider 15 to become frictionally coupled to flange 24 of tubular driven shaft 17 by low-torque clutch 23. Insofar as the direct drive from spider 20 through snubber clutch 21 to shaft 17 is concerned, clutch 23 has no effect, since the coupled member, flange 24, is also connected to driven shaft 17, but this clutch 23 is valuable for starting the corresponding engine initially, restarting the corresponding engine while in flight and to prevent over-revolution or overrunning of the propeller or propellers, as might otherwise occur, for instance, in a glide of an airplane driven by the power plant described.

Thus, for starting the engine driving power input shaft 1 and assuming that power input shaft 2 is operating and driving tubular driven shaft 17 through snubber clutch 21', opening of valve 44 causes spider 15 to be connected to rotating flange 24 on driven shaft 17, by means of clutch 23, even though snubber clutch 21 is disengaged from spider 15 because tubular shaft 17 is overrunning spider 15. Shaft 17, driven by shaft 2, thus drives spider 15 whose planet pinions 11 roll around locked sun gear 27 to drive internal ring gear 10, connected external ring gear 8 and pinion 7 on shaft 1. Actuation of the throttles and the ignition switch for the engine connected to shaft 1 then causes it to start. When it achieves the speed at which driving shaft 2 is rotating tubular shaft 17, snubber clutch 21 directly couples spider 15 to shaft 17 and then both engines simultaneously drive shaft 17 and connected output shafts 3 and 4.

In the event that the propeller or propellers tend to over-revolve or overrun the tubular shaft 17, as during a glide, so that snubber clutches 21 and 21' tend to disengage, such action is prevented by clutches 23 and 23' which continue to couple driven shaft 17 to spiders 15 and 15' as long as the corresponding valves 44 and 44' remain open to engage respective clutches 23 and 23'.

In case of either source of power connected to input shafts 1 and 2 fails, or breakage occurs in the planetary gearing connecting shaft 1 or 2 to tubular driven shaft 17, so that the corresponding spider 15 or 15' lags, respective snubbing clutch 21 or 21' instantly disengages, thus leaving the shaft 17 and output shafts 3 and 4 to be driven by the remaining power plant. When this occurs, clutch 23 or 23' will slip momentarily under load, which requires that the clutches be designed with adequate heat capacity to avoid overheating under such circumstances and also to carry the minimum torque necessary to prevent overrunning or to drive the inactive engine on starting, or both, as explained above. As soon as the oil pressure from the failed engine drops, however, the oil pressure in cylinder 38 or 38' falls and releases both brakes 32, 33 and clutch 23 or brake 32', 33' and clutch 23', as will be discussed later. Again, it may be that the first sign of an engine failure would be a drop in engine oil pressure which, in turn, can be made to cause a drop in oil pressure in cylinder 38 or 38', thereby causing the corresponding engine to be disconnected from the output shaft by releasing brakes 32, 33 and clutch 23 or brake 32', 33' and clutch 23', as will be discussed later. Valves 44 or 44' are the manual control valves by means of which the pilot can disconnect one or the other engine from the engine or power input shaft from the power output shaft. A pressure sensitive valve may be used to close the throttle or turn off the ignition if the pressure in line 43 or 43' drops, or do both.

In service, an engine is required to operate through a wide range of speeds and its oil pressure may normally vary through a wide range. So long as both engines are coupled to the same output shaft, however, their oil pressure should remain substantially alike. If a failure occurs in one of them, then the oil pressure in that engine will fall relative to the oil pressure in the other engine. Consequently, a diaphragm type valve, or double bellows similar to unit 53, can be used, each side of which communicates with the oil pressure from one or the other of the two engines. A drop in oil pressure of one engine relative to the other thereby causes the diaphragm or center point to move to one side or the other and this motion can be made to close a valve in corresponding supply pipe 43 or 43', shutting off the oil pressure to one or the other of respective cylinders 38 or 38', thereby disconnecting that engine from the power output shaft. The design of the valve can be made so as to control the pressure difference at which this action occurs, in accordance with the requirements for its operation.

Preferably, the oil pressure in cylinders 38 or 38' is furnished by a booster pump 69 or 69' which receives oil from the main engine oil pressure line. A hand pump 73 is provided for supplying fluid at the proper pressure to each supply pipe 43 and 43' for starting purposes. Coupling of the corresponding power input shaft 1 or 2 to the drive shaft 17 takes place when the pump attains sufficient pressure to actuate piston 39 or 39' to affect engagement of the corresponding hydraulically operated brakes for actuation of the corresponding snubber clutches 21 and 21'.

Each booster pump may be mounted in one of the coupling chambers and driven by one of the gears in this chamber. As shown in Fig. 1, power input shaft 1 may be splined to the drive shaft 68 of the booster oil pump 69 supplying oil under pressure through pipe 70 to hydraulic clutch supply pipe 43. It will be observed that with this arrangement, it is possible to have one engine developing full power while the other engine is developing relatively little power and to have the two engines remain coupled to the power output shaft with this arrangement. Only in case of mechanical or oil pressure failure in one or the other engine, will that engine become automatically disconnected from the power output shaft. If an engine has been stopped in flight and if it is desired to restart the engine in order to have additional horsepower available for emergency, the engine can be started by the use of hand pump 73 or 73' to engage the oil pressure control brakes 32, 33 or 32', 33'. On the other hand, it may be desired to have a separate starter on each engine, in which case an engine could be restarted in flight and run up to the same speed as the other engine before engaging the brakes and corresponding clutches. The brake and clutch engagement, in this case, is controlled by operation of the manual valves 44 and 44'. Similarly, for power input shaft, a booster pump 69' driven thereby is connected by pipe 70' through open valve 44' to clutch supply pipe 43' so that the right-hand unit is automatically controlled in accordance with its engine operation. When starting on the ground with the usual engine starter, the hydraulically operated brake and clutches of the first engine may be engaged by means of hand pump 73 or 73' so as to connect the propeller to the engine to serve as a flywheel and thus aid in starting. The hand pump 73 or 73' may be used to engage the corresponding brake in the second engine to start it from the first in the manner described, to couple a dead engine to shaft 17. Alternately, if a suitable flywheel mass is incorporated within the gearing in the coupling chamber or on power input shaft 1 or 2, as by means of a cooling fan, each engine can be started independently by its own starter and coupled to the power output shaft 17 as desired.

Preferably, as stated above, oil is supplied to booster pump 69 or 69' from the corresponding main engine oil pump line. Alternatively, however, it may be desired to avoid the circulation of engine oil within the brake chamber 38 or 38'. In such cases, the pressure of the oil from gear pumps 69 and 69' may be controlled indirectly by the main engine oil system pressure by means of a pressure relief valve 75 such as is shown by Fig. 5, which is inserted in brake oil supply lines 43 and 43'. Relief valve 75 comprises a valve 76 normally urged to closed position by spring 77 and having a piston 78 in chamber 79 supplied by pipe 80 with oil under pressure from the main oil system. When the main oil system pressure drops, spring 77 closes valve 76 proportionally, thus reducing the pressure on the brakes by the corresponding pumps 69 and 69'. When the normal oil pressure drops so that piston 78 can no longer overcome spring 77, valve 76 closes, shutting off the brake-engaging pressure.

The torque meter 53 indicates the relative torques delivered by the corresponding power plants connected to shafts 1 and 2. The differential action of the bellows 52 and 52' is such that when pointer 54 is in mid-position, it indicates that both power plants are delivering equal torque. When pressure in bellows 52 falls off, due to malfunctioning of the power plant connected to shaft 1, pointer moves to the left, indicating that power plant No. 1 is not delivering full torque; similarly, movement of the pointer to the right would indicate a failure of No. 2 engine. Instead of a differential torque gauge 53, each bellows 52 and 52' may actuate a separate pointer over its corresponding dial, or both pointers may be juxtaposed and operate over a common dial. Bourdon tubes may likewise be used in place of bellows 52 and 52'. With any arrangement of torque meters as described above, the pilot knows at all times if both engines are delivering full torque. He can thus detect any slight drop in power in either engine and can shut that engine off by closing its throttle and/or valve 44 or 44'. In this way it may be possible to avoid a serious engine failure or to spare a weak engine for use in case of emergency. Either engine may be idled indefinitely when disconnected from shaft 17 if it is coupled to an adequate flywheel mass. Such a mass may be supplied in one of the gears in the reduction train or by a cooling fan on the engine drive shaft 1 or 2, or by a separate flywheel.

The same advantages inure to the driving gearing when applied to a single power output shaft driven by either or both of the power input shafts, as described. In that case, the tubular shaft 17 of Fig. 1 serves as the power output shaft and reversing gearing 56—62 is omitted. Such a mechanism is shown in Fig. 4, wherein arrangement of the parts is substantially identical to that in Fig. 1, the single output shaft being identified by numeral 17', except that the planetary gearing is inverted as shown, and a double partition 26' separates the two planetary units. These partitions 26' may be spaced apart as far as desired inasmuch as the planetary units are individual in construction and operation.

In the inversion of planetary parts shown in Fig. 4, the sun gears 27a and 27b are driven from the power input shafts 1 and 2 and the ring gears 8a and 8b are held normally stationary by the corresponding hydraulically operated brakes 32a and 32b, which, when engaged, also urge planet spiders 15a and 15b against brakes 23a and 23b, respectively, which are backed by rings 24a and 24b mounted on output shaft 17', for the purposes described in connection with Fig. 1. The corresponding snubber clutches 21a and 21b go into and out of action under control of hydraulically operated brakes 32a and 32b, as described, and torque is also indicated as shown in Fig. 3.

Operation of the single output shaft arrangement of Fig. 4 is the same as that of Fig. 1, in that operation of hydraulic brake 32a for the left-hand unit driven by input shaft 1 causes that unit to be connected to power output shaft 17' through snubbing clutch 21a. Similarly, engagement of the hydraulically operated brake 32b for power input shaft 2, causes the right-hand planetary unit to be coupled to power output shaft 17' by snubber clutch 21b, so that both power input shafts 1 and 2 simultaneously drive power output shaft 17'. The remaining operating features are the same as described in connection with Fig. 1.

Although a preferred embodiment of the invention has been illustrated and described herein, particularly as applied to parallel power plants, it is to be understood that it is equally applicable to tandem power input shafts, and the system is otherwise susceptible to changes in form and detail within the scope of the appended claims.

I claim:

1. In a power plant including a power output shaft and a plurality of power input shafts, the combination of a mechanism connecting said power output shaft to each power input shaft, a friction coupling means interposed in each said mechanism, fluid-pressure means connected to each said coupling means for engaging the same, a fluid pump driven by each said power input shaft and connected to the corresponding fluid pressure means for controlling the same, and a second fluid pump driven by said power plant feeding each of said first fluid pumps, whereby a failure of the oil supply in said power plant reduces the fluid supply to said first fluid pumps and causes the corresponding coupling means to become disengaged.

2. In a power plant including a power output shaft and a pair of power input shafts each driven by a separate power unit, the combination of mechanism connecting said power output shaft to each power input shaft, a friction coupling means interposed in each said mechanism, fluid-pressure means connected to each clutch for engaging the same, a fluid pump driven by each power input shaft and connected to the corresponding fluid pressure means for controlling the same, second fluid pumps driven by separate power units, and means responsive to reduced pressure output of one of said second fluid pumps relatively to the other for controlling the supply of fluid to the first pump corresponding to said one second pump, whereby a reduction in the fluid pressure output of one of said second pumps relative to the fluid pressure of the other second pump allows the corresponding fluid pressure means to disengage the corresponding coupling means.

3. In a mechanism for driving a power output shaft from a plurality of power input shafts, the combination of a pair of gears each connected to one of said power input shafts and having an internal gear, a sun gear spaced from each internal gear, a set of planet pinions interposed between each internal gear and the corresponding sun gear, a spider carrying each set of planetary pinions, an overrunning clutch interposed between each spider and said power output shaft, a normally disengaged friction coupling means interposed between each spider and said power output shaft, a relatively stationary member, a normally disengaged second friction coupling means interposed between each sun gear and said member, and means for simultaneously engaging each set of corresponding first and second coupling means at will to thereby lock the corresponding sun gear and to couple its spider to said output shaft independently of the corresponding overrunning clutch.

4. In a mechanism for driving a power output shaft, from a plurality of power input shafts, the combination of a pair of gears each connected to one of said power input shafts and journalled about said power output shaft, each of said gears having an internal gear, a sun gear spaced from each internal gear, a set of planet pinions interposed between each internal gear and the corresponding sun gear, a spider carrying each set of planetary pinions and connected to said power output shaft, a casing for said gearing constituting a relatively stationary member, a friction coupling means interposed between said stationary member and each sun gear, and means for actuating said coupling means at will to thereby lock or unlock the corresponding sun gear to said stationary member.

5. In a mechanism for driving a power output shaft from a plurality of power input shafts, the combination of a pair of ring gears each connected to one of said power input shafts and having an internal gear, a sun gear spaced from each internal gear, a set of planet pinions interposed between each internal gear and the corresponding sun gear, a spider carrying each set of planetary pinions and connected to said power output shaft, a relatively stationary member, a friction coupling means interposed between said stationary member and each sun gear, an annular cylinder corresponding to each coupling means carried by said stationary member, a piston in each cylinder connected to the corresponding coupling means for actuating the same, a source of fluid pressure connected to each cylinder, and a valve interposed in the connection between said source and each cylinder for controlling the corresponding coupling means to connect the several sun gears to and disconnect them from said stationary member at will.

6. In a mechanism for driving a power output shaft from a power input shaft, the combination of a ring gear driven by said power input shaft, an internal gear carried by said ring gear, a sun gear, a plurality of planet pinions interposed between said sun and internal ring gear, a spider carrying said planet pinions, an overrunning clutch interposed between said spider and said power output shaft, a relatively stationary member, a friction coupling means interposed between said member and said sun gear, and means for actuating said coupling means to couple said sun gear to said stationary member, whereby the power output shaft is driven through said gearing and overrunning clutch by said power input shaft.

7. In a mechanism for driving a power output shaft from a plurality of power input shafts, the combination of a pair of gear units each connected to one of said power input shafts and having a sun gear, an internal gear spaced from each sun gear, a set of planet pinions interposed between each internal gear and the corresponding sun gear, a spider carrying each set of planetary pinions, means connecting said spider to said power output shaft, a relatively stationary member, a friction coupling means interposed between said stationary member and each internal gear, and means for actuating said coupling means at will to thereby lock or unlock the corresponding internal gear to or from said stationary member.

8. In a mechanism for driving a power output shaft, from a plurality of power input shafts, the combination of a pair of gear units each connected to one of said power input shafts and journalled about said power output shaft, each of said gear units having an internal gear, a sun gear spaced from each internal gear, a set of planet pinions interposed between each internal gear and the corresponding sun gear, a spider carrying each set of planetary pinions, an overrunning clutch interposed between said spider and said power output shaft, a casing for said gear units constituting a relatively stationary member, a friction coupling means interposed between said stationary member and each sun gear, and means for actuating said coupling means at will to thereby lock or unlock the corresponding sun gear to or from said stationary member.

9. A mechanism for driving a power output shaft from a power input shaft, comprising a transmission including gear elements and supporting elements therefor interposed between said shafts and driven by said power input shaft, an overrunning clutch interposed between one of said supporting elements and said output shaft for connecting them when said one element tends to overrun said shaft, an engageable and disengageable friction clutch interposed between said one supporting element and said output shaft for coupling them independently of said overrunning clutch, an engageable and disengageable friction coupling means interposed in said transmission for causing the establishment of a driving connection between said input shaft and said one supporting element, and means for engaging and disengaging said friction clutch and said friction coupling.

10. A mechanism for driving a power output shaft from a power input shaft, comprising a transmission including gear elements and supporting elements therefor interposed between said shafts and driven by said power input shaft, an overrunning clutch interposed between one of said supporting elements and said output shaft for connecting them when said one element tends to overrun said shaft, an engageable and disengageable friction clutch interposed between said input shaft and said output shaft for establishing a two-way driving connection between said input shaft and said output shaft separate from said overrunning clutch, an engageable and disengageable friction coupling means interposed in said transmission for causing the establishment of a driving connection between said input shaft and said one supporting element, and means for simultaneously engaging and disengaging said friction clutch and said friction coupling.

11. A mechanism for driving a power output shaft from a pair of power input shafts, in which the driving mechanism between each input shaft and the output shaft comprises a transmission including gear elements driven by an input shaft and supporting elements for said gear elements, a one-way drive interposed between one of said supporting elements and said output shaft for coupling said one supporting element to said output shaft when said one supporting element tends to overrun said output shaft, an engageable and disengageable friction clutch interposed between said input shaft and said output shaft for establishing a two-way driving connection between said shafts separate from said one-way drive, and engageable and disengageable coupling elements interposed in said transmission for causing the establishment of a driving connection between said input shaft and said one supporting element, and means for engaging and disengaging said friction clutch and said coupling.

ALFRED T. GREGORY.

REFERENCES CITED

The following references are of record in the file of this patent:

UNITED STATES PATENTS

| Number | Name | Date |
|---|---|---|
| 1,754,192 | Van Vliet | Apr. 8, 1930 |
| 1,902,701 | Hegemann | Mar. 21, 1933 |
| 2,018,014 | Fahrney | Oct. 22, 1935 |
| 2,333,668 | Neracher et al | Nov. 9, 1943 |
| 2,346,168 | Jones | Apr. 11, 1944 |
| 2,349,410 | De Normanville | May 23, 1944 |
| 2,353,814 | De Pew | July 18, 1944 |
| 2,366,646 | Orr | Jan. 2, 1945 |
| 2,418,378 | Voytech | Apr. 1, 1947 |